United States Patent Office 3,462,354
Patented Aug. 19, 1969

3,462,354
ION-MOLECULE REACTIONS
Boris Levy, Crosswicks, N.J., assignor to Mobil Oil Corporation, a corporation of New York
No Drawing. Filed June 16, 1964, Ser. No. 375,631
Int. Cl. C07c 3/24; B01j 1/10
U.S. Cl. 204—158     13 Claims

ABSTRACT OF THE DISCLOSURE

A method for carrying out an ion-molecule reaction in a gaseous system comprising a molecule reactant, an ion reactant precursor, and a rare gas, said molecular reactant having an ionization potential greater than that of said ion reactant precursor, said rare gas having an ionization potential intermediate those of said molecule reactant and said precursor and above that of the precursor, said rare gas being present in a major amount and said molecule reactant being present in an amount greater than that of said precursor, and irradiating said mixture with ionizing radiation.

---

This invention relates to ion-molecule reactions carried out by means of nuclear radiation.

Nuclear radiation is capable of breaking any chemical bond, even in the most stable compounds. As a result, a wide distribution of products may be found when even simple compounds are irradiated. The invention proposes to make use of this capability in order to produce useful and interesting products in increased yields; and in particular to carry out radiation-induced chemical reactions in the gas phase, where ions initially formed by radiation interaction are found to have relatively long lifetime and where, as a result, there is good probability that they may react with neutral molecules. More particularly, the invention proposes to make use of a rare gas to absorb most of the radiation energy, thereby forming rare gas ions which then transfer charge to a reactant molecule, ionizing the latter, and these ions react with another reactant molecule in an ion-molecule reaction to form products of value. Thus, instead of gross bond breakage, as might be expected from direct radiation interaction, useful ion-molecule reactions take place.

In a preferred form, the invention comprises a method for carrying out an ion-molecule reaction in a system wherein the molecule reactant has an ionization potential greater than that of the ion reactant. It comprises forming a gaseous mixture of the molecule reactant, a precursor of the ion reactant, and a rare gas having an ionization potential intermediate the ionization potentials of the molecule reactant and the precursor. The rare gas is present in a major amount and the molecule reactant is present in an amount greater than that of the precursor. The mixture is irradiated with ionizing radiation at a rate and intensity sufficient to ionize the rare gas, whose mass fraction in the mixture is sufficiently high that a major portion of the absorbed radiation is absorbed by it, and thereafter the ionized rare gas reacts with precursor to effect charge transfer, thereby forming the ion reactant and neutralizing the rare gas. The ion and molecule reactants then react to form a product, and this reaction is at least thermoneutral and preferably exothermic. The product is suitably recovered.

An illustrative system is one comprising ethane, carbon monoxide (hereinafter designated CO), and xenon. Ethane, $C_2H_6$, is the precursor of the ion reactant and forms such reactant, $C_2H_6^+$, upon being ionized. The CO is the molecular reactant, and xenon is the ionizable rare gas. The ionization potential of ethane is 11.5 ev. (electron volts), which signifies that when a molecule of ethane in its normal or ground state absorbs 11.5 ev. of radiation energy, it can be expected to lose an electron and form a positively charged ion, $C_2H_6^+$. The ionization potential of CO is 14.00 ev., and that of xenon is intermediate these values, namely, 12.13 ev., and as may be apparent, and preferred, is only slightly greater than the value of ethane. These gases are mixed together such that the xenon is present in major amount, and the CO in an amount greater than the ethane. The mixture is then subjected to ionizing radiation applied at a rate and intensity sufficient to ionize the xenon. It is preferred that most of the absorbed radiation is absorbed by the xenon, whose mass fraction in the mixture is purposely made sufficiently high to bring about this result. Charge transfer then takes place between the ionized xenon and the ethane, this being possible by virtue of the higher ionization potential of xenon.

Following charge transfer, the ionized xenon becomes neutral, and the resulting ethane ions are able to react with the molecular CO in an ion-molecule reaction. Without being bound by theory, it is considered that an exothermic reaction like the following may occur:

$$C_2H_6^+ + CO \rightarrow (C_2H_6CO)^+$$

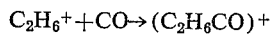

The ionic entity on the right is reactive, either with itself, or with one or both reactants on the left, or with ethane, or with all entities, or it may become neutralized. It is thus possible to form one or more of a number of different products of varying molecular weight depending on the way the ionic product in the foregoing equation reacts. The ultimate product may be a polymeric material of varying molecular weight which contains ester groups, and either ketone or aldehyde groups or both, and which is described in more detail in the examples that follow. Or it may be a non-polymeric material of some complexity having one or more of the groups just noted; or it may be a fairly simple compound.

It is of particular interest to note that bond breakage of the ethane and CO is minimized by the presence of a large concentration of xenon, which absorbs most of the radiation, thus protecting, so to speak, the other components against bond breakage, and which further tends to transfer only an amount of energy to the ethane to effect charge exchange.

The foregoing process is performable at ambient temperatures and pressures and for varying times. It is possible to convert a large proportion of the ethane, going up to 80, 90, or even 100% of the amount originally present. Some by-product gases are observable, like hydrogen, carbon dioxide, and n-butane in very small amounts of the order of less than 1 mole percent of the original gaseous mixture.

The method provides a convenient way of obtaining interesting products of the kind described from compounds like ethane, which is generally considered a low value hydrocarbon. In particular, the polymeric product is considered of value per se, and also because of its constituent groups. By virtue of the latter, the material tends to be reactive, so that it may be modified to form other interesting products, and it may be useful as a modifier for other polymers and materials. It is further distinctive in being formed by a gaseous phase reaction; thus, unreacted monomer of the polymeric material is substantially absent, unlike some conventional polymeric materials which are formed from conventional monomers by liquid phase reactions. Yields of up to 90%, or more based on the ethane, are obtainable.

High energy ionizing radiation of any kind and from any suitable source may be used to irradiate, including both ionizing particle radiation and ionizing electromagnetic radiation; the former comprises accelerated electrons, nuclear particles like protons, fast neutrons, alpha and beta particles, deuterons, fission fragments, and the like; and the latter comprises gamma rays and X-rays. Gamma rays are a convenient and practical radiation.

The radiation may be obtained from various sources, including natural radioactive materials, which emit alpha, beta, and gamma radiation; from nuclear fission by-products of processes in which atomic power is generated, these by-products including elements having atomic numbers ranging from 30 to 63; from materials made radioactive by exposure to neutron radiation, such as cobalt-60, caesium-137, sodium-24, manganese-56, gadolinium-72, lanthanum-140, etc.; or from operating nuclear reactors. The charged particles may be brought to high energy levels by acceleration in conventional devices. For example, high speed electrons having energies of 0.5 to 15 mev. can be supplied by Van de Graff generators, resonant transformers, linear accelerators, etc. High energy X-ray machines are a source of X-rays.

A practically useful energy level for the process is 1 mev., although the level may range from 0.5 to 15 mev., and more broadly from 0.01 kev. to 20 or 30 mev. It will be understood that the invention is not dependent on the energy level of the radiation, which may be as low as is effective, i.e., sufficient to ionize the rare gas, and as high as desired. The total radiation dose is variable, but should be at least sufficient to produce a chemical conversion and, of course, not so high as to destroy the product. Total dose may range from 0.0001 to 1,000, but preferably from 0.01 to 100, megarads. Useful dose rates may run from 0.1 to 1 megarad/hour, although this value may be increased or decreased as desired. A typical range is 0.01 to 10 megarads/hour, and a more general range is 0.001 to one thousand megarads/hour. Some control over the molecular weight of the product is possible by varying the dose rate, the product tending to be of lower molecular weight at higher dose rates and of higher molecular weight at lower dose rates. Variation of dose rate may be accomplished by varying the source strength of radiation, keeping the rate gas concentration constant, or by varying the rare gas concentration, keeping the radiation source strength constant.

Irradiation can be done at normal or ambient temperatures. There is no lower temperature limit, although the upper limit is desirably chosen to preserve the product. Pressures may be ambient or may range from subatmospheric to any desired greater pressure, for example up to 1 or 2 thousand atmospheres, or more. Irradiation times are widely variable.

Other systems of gaseous reactants that may be irradiated to form useful products are suitable for the practice of the invention. Thus, using CO as the molecular reactant, one system includes propane as the ion reactant or precursor thereof, and xenon as the rare gas. Ionization potentials of the CO and propane are 14.00 and 11.2 ev., respectively, while that of xenon is 12.13 ev. which is intermediate the other two and only a little larger than the propane value. Another system (with ionization potentials immediately following each reactant) includes CO 14.00 ev., xenon 12.13 ev., and ethylene 10.51 ev. Other systems are CO 14.00 ev., xenon 12.13 ev., and n-butane 10.8 ev.; also CO 14.00 ev., xenon in an excited state 13.44 ev., and methane 13.2 ev. In the last system the methane, upon absorption of 13.2 ev., is regarded as forming $CH_4^+$. Another system comprises CO 14.00 ev., krypton 14.0 ev., and methane 13.2 ev.

It will be apparent that the CO may also act as the ion reactant precursor, and in such event a suitable system includes methane as the molecule reactant and krypton as the rare gas. The ionization potentials are methane 14.31 ev. (regarded as forming $CH_3^+$), krypton 14.0 ev., and CO 14.00 ev. Another system is methane 15.6 ev. (regarded as forming $CH_2^+$), krypton 14.0 ev. or krypton in an excited state 14.67 ev., and CO 14.00 ev.

Other reactant molecules are useful besides CO, it being understood that the choice is also dependent on the ion reactant and the rare gas in the manner described. With this in mind, suitable compounds include oxygen, nitrogen, hydrogen, water, carbon dioxide, ammonia, methane, etc. The ion reactant precursor may be selected from a wide variety of compounds, including any of the foregoing molecule reactants, and also compounds such as nitrous oxide, hydrogen sulfide, and low molecular weight easily volatilized alcohols like methanol, ethanol, and the like. Also, hydrocarbons like methane, ethane, propane, isopropane, and other alkanes, and olefins like ethylene, propylene, various butenes, acetylene, methylacetylene, ethylacetylene, allene, butadiene-1,3, butadiene-1,2, etc. Illustrative systems may be set forth briefly as follows: carbon dioxide 13.79 ev. xenon in an excited state 13.44 ev., and methane 13.2 ev.; also water 12.61 ev., xenon 12.13 ev., and ethylene 10.51 ev.; also CO 14.00 ev., xenon 12.13 ev., and ammonia 10.51 ev.; also nitrogen 15.56 ev., krypton in excited state 14.67 ev. or xenon in excited state 13.44 ev., and oxygen 12.2 ev.; and hydrogen 15.43 ev., krypton in excited state 14.67 ev., and CO 14.00 ev.

As is believed to be clear, in each of the foregoing systems the reactants and rare gas may not be mixed indiscriminately and then subjected to ionizing radiation with the expectation of obtaining the benefits of the invention. Rather, they may be mixed only in accordance with the described conditions of ionization potential, concentration, and reaction thermoneutrality of exothermicity.

In other words, the concentration of each component is as previously described, namely, the rare gas is present in major amount; and the molecular reactant concentration is greater than that of the ion reactant in order to avoid as much as possible reaction of the latter with itself. The ionization potentional of the rare gas should be intermediate those of the reactants and somewhat above that of the ion reactant precursor. Further, in each system the chemical reaction between the ion and molecular reactants is either thermoneutral or exothermic to insure that the reaction is thermodynamically possible. It is believed as indicated. It is possible that other reactions may take place and may account for the results, at least in part. Also, and as indicated, it will be understood that in referring to the ionization potential of any compound, there is contemplated not only the potential of the ground state of the compound but also that of its excited state or states.

A desirable modification of the invention comprises irradiating a system in which both the ion reactant precursor and the molecule reactant are ionized by charge transfer from the ionized rare gas. In this case, both reactants have approximately the same ionization potential while that of the rare gas is slightly greater. Illustrative of such a system is CO 14.00 ev., methane 14.31 ev., and argon 15.76 ev. or krypton in an excited state 14.67 ev. In these systems the rare gas is present in major amount, while the reactants may be present in substantially equal proportions, or the amount of one may be somewhat greater than the other. The chemical reaction between the reactants is, of course, one that is thermodynamically allowable.

A second modification comprises employing a rare gas whose ionization potential is sufficiently greater than that of the ion reactant precursor that upon irradiation of such a system, which is to be understood as including a molecule reactant, the precursor will predominantly undergo fragmentation to form several ionic species and/or free radicals. In other words, changes more far reaching than charge transfer take place, involving formation of lighter ionic and/or free radical species which react with one another, and/or with the molecule and/or ion reactants, to form products of interest. An illustrative system comprises CO 14.00 ev., ethane 11.5 ev., and argon 15.76 ev., where the ionization potential of argon is 4.2 ev. greater than that of ethane. Still other systems are like the foregoing but have neon 21.6 ev., or helium 24.6 ev., or excited krypton 14.67 ev., or krypton 14.0 ev. in place of the argon. Another system comprises CO 14.00 ev., argon 15.67 ev., and methane 13.2 ev., and in this system the argon may also be replaced by neon 21.6 ev. or helium 24.6 ev. In this modification it is preferred, at least for some cases, to select a rare gas having an ionization potential at least two electron volts greater than that of the ion reactant precursor.

In another modification, fragmentation of both reactants is possible by using a rare gas having an ionization potential sufficiently greater than that of either reactant that transfer of energy from the ionized rare gas results predominantly in the fragmentation of both reactants with formation of lighter ionic and/or free radical species capable of reacting further, as described. Preferably the reactants have approximately the same ionization potential, and preferably too, at least in some cases, the rare gas has an ionization potential at least two electron volts greater than that of the reactants. Illustrative of this modification is the system: neon 21.6 ev., methane 14.31 ev., and CO 14.00 ev. Helium 24.6 ev. may be used in place of neon. Another system is argon 15.76 ev., carbon dioxide 13.79 ev., and methane 13.2 ev., with neon 21.6 ev. or helium 24.6 ev. being suitable in place of the argon.

A further modification comprises irradiating two ion reactant precursors, together with the molecule reactant and the rare gas, to the end of forming products of further interest. Or two molecule reactants may be mixed with an ion reactant precursor and the rare gas and irradiated. In either case, a molecule reactant has the greatest ionization potential of the system followed by rare gas and then by ion reactant precursor; the rare gas is present in major amount, and the concentration of molecule reactant exceeds that of ion reactant precursor; and in addition, the reaction involving all reactants should be a thermoneutral or exothermic one. As an example, a suitable system comprises CO 14.00 ev. as the molecule reactant, xenon 12.13 ev. as rare gas, and ethane 11.5 ev. and ammonia 10.52 ev. as ion reactant precursors. It will be understood that in these three-reactant systems the procedures described in the preceding modifications may apply, that is, the reactants and rare gas may be selected so that all reactants are ionized by charge transfer from the rare gas; or the selection may be such that the ion reactant or reactants undergoes fragmentation as the predominant reaction; or the selection may be such as to secure fragmentation of all reactants as the predominant reactions.

A number of compounds suitable for use as molecule reactants, under appropriate conditions, have been described, all of which are characterized by being either normally gaseous or having such low boiling points as to be vaporized under the conditions of the reaction. Generally speaking, preferred groups of molecule reactants comprise oxygen-containing compounds, nitrogen-containing compounds, and the oxides of carbon. Suitable ion reactant percursors, again under appropriate conditions, may include any of the foregoing molecule reactants; also volatile compounds like cyanogen, hydrogen cyanide, hydrogen chloride, chlorine, fluorine, sulfur dioxide, silicon fluoride, silicon hydride, and various other hydrides. In general, a preferred group of ion reactant precursors compises hydrocarbons. The rare or inert gases include helium, neon, argon, kryton, xenon, and radon, if desired, two or more of these may be used together.

The invention may be illustrated by the following examples.

Example 1

A mixture of gases comprising 68.2 mole percent xenon, 29.3 mole percent carbon monoxide, and 2.5 mole percent ethane was formed and introduced to an evacuated 1-liter glass bulb equipped with an inlet and an outlet tube at its upper end and closed off at its lower end. The mixture was allowed to fill the bulb at a total pressure of 60 cm. of mercury at room temperature, and the bulb sealed off. The bulb, which was in the form of an elongated cylinder, was then disposed, in an upstanding position, centrally of a group of 8 upstanding pencils or rods of cobalt-60 in such a way that the pencils were arranged circumferentially of an parallel to the glass cylinder. The mixture was irradiated at ambient temperature, although some gamma heating took place which raised the temperature to about 40° C. The dose rate was about 0.6 megarad per hour, and it was calculated that approximately 90% of the absorbed energy was absorbed by the xenon. Irradiation of the gaseous mixture was carried out for about 94 hours, after which the vessel was removed from the hot cell. It was noticed that droplets of liquid product and/or liquid film appeared in the bottom of the vessel, and that the sidewalls were free of any material.

Analysis of the gaseous mixture remaining in the vessel, together with the analysis before irradiation, is as follows, in mole percent:

|  | Zenon | CO | Ethane | $H_2$ | $CO_2$ |
|---|---|---|---|---|---|
| Before | 68.2 | 29.3 | 2.5 |  |  |
| After | 70.2 | 28.4 | 0.5 | 0.7 | 0.2 |

As is apparent, about 80% of the ethane initially present reacted. Hydrogen is substantially the only product gas formed. G values (molecule of gas reacting or produced per 100 electron volts of radiation energy absorbed by the system) were calculated as follows:

G (-ethane) _____ 4.45
G (-CO) _____ 3.53
G (hydrogen) _____ 1.29

The liquid product, comprising a clear, slightly yellow, viscous liquid was collected. It weighed 33 mg., representing a yield of about 80%, based on the ethane. Infrared analysis revealed the presence of ester groups and ketone and/or aldehyde groups. Mass spectrographic analysis confirmed the presence of oxygen and indicated a molecular weight having a lower limit of about 200. A carbon-hydrogen analysis showed:

Percent
Carbon _____ 54.8
Hydrogen _____ 7.8
Oxygen (by difference) _____ 37.7

A tentative empirical formula of the liquid gas was considered to be $(C_{4.5}H_{9.1}O)n$.

Example 2

Following the same procedure of Example 1, except that the total pressure was 35 cm., and the irradiation time was 67 hrs., another gaseous mixture of xenon, CO, and ethane was irradiated. Analysis of the mixture before and after irradiation, in mole percent, is:

|  | Zenon | CO | Ethane | $H_2$ | $CO_2$ | n-Butane |
|---|---|---|---|---|---|---|
| Before | 68.2 | 29.3 | 2.5 |  |  |  |
| After | 71.7 | 26.4 | 1.1 | 0.6 | 0.1 | 0.1 | about 50% of the ethane reacted. G. values were calculated as follows:

G (-ethane) _____ 4.33
G (-CO) _____ 3.05
G (hydrogen) _____ 1.80

A viscous liquid product collected on the bottom of the vessel. Its molecular formula was determined as $(C_{4.1}H_8O)n$.

Example 3

A gaseous mixture having the same composition as that of Example 1 was irradiated for 72 hrs. at a pressure of 11.4 cm., using the same dose rate and equipment. Initial and final gas analyses were very much like those of Example 1 and therefore are not repeated, except to say that only 60% of the ethane reacted, owing to the lower total dose. G values very similar to those reported in Example 1 were obtained, as was the viscous liquid product.

Another run at a pressure of 24 cm. produced substantially the same results as the foregoing.

Example 4

Another gaseous mixture having the composition of Example 1 was irradiated over a period of 78 hrs. at a pressure of 60 cm. using the dose rate of said example. In this case an effort was made to recover any light products, other than hydrogen and carbon dioxide, by connecting the outlet tube at the upper end of the irradiation vessel to an ice-cooled receiver disposed some distance from the vessel and shielded therefrom by a lead wall. However, no such products were recovered. The composition of the gas mixture after irradiation was substantially like that in Example 1, as was the viscous liquid product. About 68% of the ethane reacted.

Example 5

A mixture of gases was formed comprising 73.8 mole percent xenon, 23.5 mole percent carbon monoxide, 2.5 mole percent ethane, and 0.2 mole percent ammonia and irradiated as in Example 1 at a total pressure of 66 cm. over a period of 92 hours. The dose rate was about 0.6 megarad per hour, and approximately 90% of the absorbed energy was absorbed by the xenon. It was noted that more droplets of viscous liquid product formed than in Example 1 and that they were of less regular shape. A carbon-hydrogen-oxygen analysis showed:

| | Percent |
|---|---|
| Carbon | 61.58 |
| Hydrogen | 9.18 |
| Oxygen | 14.33 |

The difference between the total of carbon, hydrogen, and oxygen, and 100%, was 14.91% and was regarded as nitrogen. Upon extraction of the viscous liquid product with carbon tetrachloride, a fraction of the same dissolved, and a white solid residue was left undissolved. In the preceding examples no residue was obtained. Infrared analysis of the soluble fraction revealed the presence of acid or ester group, and also ketone and/or aldehyde groups.

It will be understood that the invention is capable of obvious variations without departing from its scope.

In the light of the foregoing description, the following is claimed.

1. A method for carrying out a thermoneutral to exothermic ion-molecule reaction in a gaseous system consisting essentially of a molecule reactant selected from the oxides of carbon, a hydrocarbon ion reactant precursor, and a rare gas, said rare gas having an ionization potential greater than that of said other components and being present in a major amount, irradiating said mixture with gamma radiation to ionize said rare gas, absorbing a major portion of the absorbed radiation in said rare gas, thus helping to protect other components against bond breakage, reacting ionized rare gas with said other components to effect charge transfer, and reacting resulting species to form a product.

2. Method of claim 1 wherein said molecule reactant and said precursor have approximately the same ionization potentials.

3. Method of claim 1 wherein said rare gas has an ionization potential at least two electron volts greater than ion reactant precursor.

4. A method for carrying out a thermoneutral to exothermic ion-molecule reaction in a gaseous system consisting essentially of a molecule reactant selected from the oxides of carbon, an ion reactant precursor, and a rare gas, said molecule reactant having an ionization potential greater than that of said ion reactant precursor, said rare gas having an ionization potential intermediate those of said molecule reactant and said precursor but above that of the precursor, said rare gas being present in a major amount and said molecule reactant being present in an amount greater than that of said precursor, irradiating said mixture with ionizing radiation at a dose rate of 0.001 to 1000 megarads/hr. and an energy level of 0.01 kev. to 30 mev., said rate and energy level being sufficient to ionize said rare gas, the mass fraction of the rare gas in said mixture being sufficiently high that a major portion of the absorbed radiation is absorbed by said rare gas, thus helping to protect other components against bond breakage, reacting ionized rare gas with precursor to effect charge transfer, thereby forming ion reactant and neutralized rare gas, reacting said ion and molecule reactants to form a product, and recovering said product.

5. Method of claim 4 wherein said radiation is gamma radiation.

6. Method of claim 4 wherein said ion reactant precursor is a hydrocarbon.

7. Method of claim 6 wherein an added compound is present selected from a molecule reactant and an ion reactant precursor, said added compound being different from any other compound present.

8. Method of claim 7 wherein said added compound is a molecule reactant.

9. Method of claim 7 wherein said added compound is an ion reactant precursor.

10. Method of claim 7 wherein said added compound is ammonia, thereby to provide a product containing chemically bound nitrogen.

11. Method of claim 6 wherein up to at least 80% of said ion reactant precursor is reacted.

12. Method of claim 4 wherein said product is an oxygen-containing polymeric material.

13. Method of claim 4 wherein said molecule reactant is carbon monoxide, said precursor is an alkane, and said product is an oxygen-containing reactive polymeric material having ester groups.

References Cited

UNITED STATES PATENTS 3,092,561   6/1963   Lampe _____ 204—162 X

FOREIGN PATENTS 665,585   6/1963   Canada.

HOWARD S. WILLIAMS, Primary Examiner

U.S. Cl. X.R.

204—157.1, 162, 163

PO-1050
(5/69)

UNITED STATES PATENT OFFICE
CERTIFICATE OF CORRECTION

Patent No. 3,462,354          Dated August 19, 1969

Inventor(s) Boris Levy

It is certified that error appears in the above-identified patent and that said Letters Patent are hereby corrected as shown below:

Column 3, line 40, "rate" should be --rare--. Column 4, line 19, "ammonia 10.51" should be --ammonia 10.52--. Column 4, line 41, after "believed" insert --that the reaction proceeds along the ion molecule route,--. Column 6, line 6, "an" should be --and--. Column 6, line 59, "about" should be --About--.

SIGNED AND
SEALED
APR 28 1970

(SEAL)
Attest:

Edward M. Fletcher, Jr.
Attesting Officer

WILLIAM E. SCHUYLER, JR.
Commissioner of Patents